Dec. 22, 1970  H. A. BURGMAN  3,549,477
MOLDED COMPOSITE ARTICLE OF RESINOUS PLASTIC HAVING
A VAPOR BARRIER FILM DISPOSED
WITHIN THE PLASTIC
Filed Jan. 27, 1967
FIG.1.
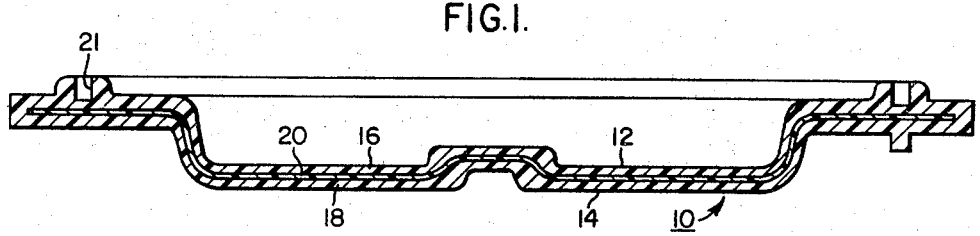
FIG.2.
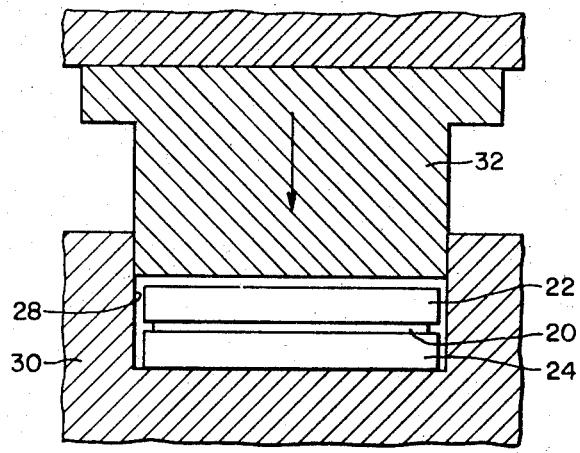
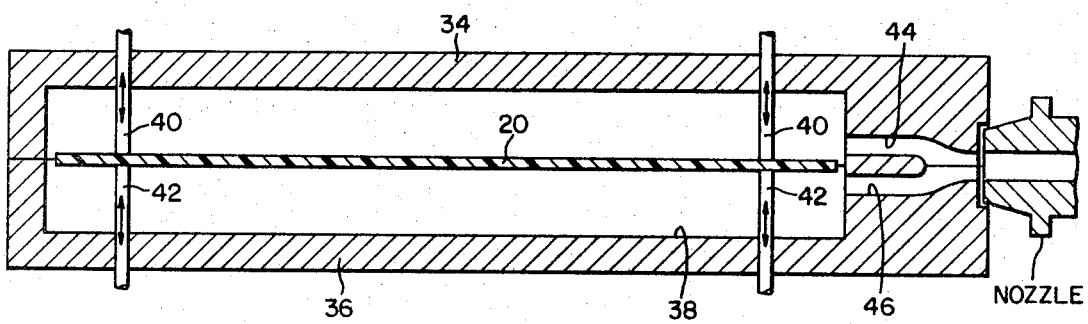
FIG.3.
WITNESSES
Theodore F. Wrobel
Lee P. Johns
INVENTOR
Herbert A. Burgman
BY
Frederick Stapor
ATTORNEY

United States Patent Office 3,549,477
Patented Dec. 22, 1970

3,549,477
MOLDED COMPOSITE ARTICLE OF RESINOUS
PLASTIC HAVING A VAPOR BARRIER FILM
DISPOSED WITHIN THE PLASTIC
Herbert A. Burgman, Pittsburgh, Pa., assignor to Westinghouse Electric Corporation, Pittsburgh, Pa., a corporation of Pennsylvania
Filed Jan. 27, 1967, Ser. No. 612,110
Int. Cl. B32b 27/08
U.S. Cl. 161—165                               6 Claims

ABSTRACT OF THE DISCLOSURE

This invention relates to a composite plastic article and method for preparing same which article is composed of a resin that is readily permeable to fluid such as water vapor and having embedded in the resin a vapor barrier film relatively impermeable to the fluid and coextensive with the cross-section of the article.

---

Solid synthetic plastic materials have been and are becoming increasingly more widely used. These plastic materials are formed of a substance which is solid in its finished state but at some stage in its manufacture is soft enough to be readily molded or formed into various shapes, usually through the application, either singly or combined, of heat and pressure.

The family of plastics today encompasses a large number of compounds differing in properties and characteristics. Among other things, such properties include ease of fabricability, dielectric constant, strength, hardness, cost, corrosion resistance, and permeability to various fluids such as carbon dioxide and water vapor. To secure a desired combination of properties a particular plastic is selected for a given purpose such as a container or conduit for fluids, a container for electronic components, or a mounting base for an electric meter. For some uses the permeability of the material to one or more gases or vapors together is a critical factor which renders it unsuitable even though other properties are acceptable, including the cost of the material. Another material which may have a satisfactory low permeability for a fluid such as water vapor may be necessary to be used in spite of a much higher cost or even if it possesses some other undesirable property.

For cost as well as for strength reasons, plastics are often loaded with a high proportion of fibrous and solid fillers such as wood flour, asbestos fibers, and cotton fibers. These fillers may greatly increase the permeability of the plastics to moisture and gases.

As an illustration, a molded plastic mounting base for electric meters may be prepared from a resinous material that has good electrical and physical properties at a low cost, but having a relatively high vapor permeability that defeats the objective of having a hermetically sealed meter. A variety of substitute resins have not satisfied the combination of low permeability at a reasonable material cost.

It has been found, in accordance with this invention, that the foregoing problems may be overcome by providing a composite plastic article composed of a body of relatively readily vapor permeable resin which includes an embedded sheet coextensive of its cross-section of a resinous compound having a minimal permeability constant for a specific fluid.

Accordingly, it is a general object of this invention to provide a composite plastic article, and method for producing the same, having a very low permeability to fluid.

It is another object of this invention to provide a molded composite plastic article in which a thin film of plastic having a low fluid permeability is disposed throughout its cross-section in order to reduce passage of fluids therethrough.

It is another object of this invention to provide a method for preparing a molded composite article of a resinous plastic of relatively low vapor permeability having a vapor barrier film disposed within the resinous plastic across the zone of vapor passage, the film having its surfaces treated to bond to the resinous plastic.

Finally, it is an object of this invention to satisfy the foregoing problems and desiderata in a simple and expedient manner.

Briefly, the present invention provides a composite plastic article having two layers of a plastic molding compound, and a film composed of a resin interposed across the entire interface between the two layers, the film being bonded to the interfaces of the layers and the film having a fluid permeability constant lower than the permeability constant for the same fluid of the plastic resin layers whereby fluids such as specific gases and vapors are greatly retarded in their passage through the article in a direction transverse to the plane of the interface.

The invention also provides a method for making the plastic article comprising the steps of inserting a film of a vapor barrier material between two bodies of a moldable plastic resin, heating the assembly of the film and bodies to a molding temperature but below the melting point of the vapor barrier film material, and applying sufficient pressure to the heated bodies and film to cause the body and film to be bonded together in a unified composite mass wherein the relatively thin film is sandwiched between two large masses of resinous plastic.

For a better understanding of the invention reference is made to the drawing in which similar numerals refer to similar parts throughout the various views of the drawing, and in which:

FIG. 1 is a transverse sectional view through a composite plastic article showing a vapor barrier film embedded between upper and lower layers of molding compound;

FIG. 2 is a sectional view showing a compression mold for forming a molded plastic article using preformed resinous discs; and FIG. 3 is a sectional view through an injection mold in which a vapor barrier film is mounted between retractable mounting pins within a mold cavity prior to injection of molding compound.

The present invention provides a composite plastic article composed essentially of two portions of molded resinous plastic with a vapor impermeable film sandwiched between the portions, the film extending across a cross-section transverse to the path of vapor flow, suitable for use as a fluid impermeable member such as a container or conduit for fluids, a fluid-tight container for electronic components, or a mounting base for an electric meter. By way of example, a mounting base 10 for a watt-hour electric meter is shown in FIG. 1. The base 10, having an upper or inner side 12 and a lower or outer side 14, is a composite or laminated-like member including upper and lower layers 16 and 18 of a plastic relatively permeable to a fluid, and an intermediate film 20 which is substantially coextensive with a transverse cross-section of the layers 16 and 18. A groove 21 formed by molded lips extends peripherally in order to receive the meter casing.

The base 10 may be made by any one of a number of processes for molding plastics including injection molding, transfer molding, and compression molding. Examples of compression and injection molding procedures are shown schematically in FIGS. 2 and 3. In FIG. 2 a pair of preformed discs 22 and 24 having the film 20 disposed between them are placed within a cavity 28 of a mold 30 and pressed by a piston or force plug 32 into the desired configuration such as the meter base 10. For simplicity the configuration of the mounting base 10 is now shown in the mold cavities of FIGS. 2 and 3. It is understood that the opposing mold surfaces; that is, the plug 32 and the lower surface of the cavity 28, have configurations suitable for forming the base 10.

The injection molding method as shown in FIG. 3 involves a pair of separable mold portions 34 and 36 forming a mold cavity 38. The film 20 is preliminarily mounted within the cavity 38 between spaced pairs of retractable mounting pins 40 and 42. During injection of molding compound (not shown) into the cavity through inlet parts 44 and 46 above and below the film 20, the pins 40 and 42 are withdrawn from the cavity 38. The film 20 of resin having a low permeability constant is thereby disposed between upper and lower portions of molding compound in the cavity.

To secure a good bond to the resinous plastic layers between which the relatively impermeable film is placed, the surfaces of the film is treated or conditioned either chemically by etching or mechanically by sandblasting or abrading. In some cases the resinous film surfaces may be treated by applying a resinous adhesive such as an epoxy resin to provide a good bond between the molded plastic and the film.

Whichever molding procedure is used, the molding compound is fabricated into a rigid molded article such as the meter base 10 with the intermediate film 20 having a lower permeability constant than that of the upper and lower layers 16 and 18. The film 20 is shown as extending close to the outer periphery of the molding 10. In some cases it may extend to the exterior periphery, or its edges may be turned up and extended to the outside lip of groove 21 in which the metal meter casing is mounted in order to minimize water vapor and gas penetration from outer surface 14.

The molding compound of which the layers 16 and 18 are composed may include any one or more of the compounds listed in Table I. These may be thermoplastic or thermosetting resins. If the latter, catalysts may be added.

TABLE I

Molding compounds

Acetal resin
Acrylic resin
Acrylonitrile-butadiene-styrene polymers
Alkyd resin
Amino resin
Cellulosic resin (e.g. esters and ethers such as ethyl cellulose and cellulose acetate butyrate)
Chlorinated polyether resin
Diallyl phthalate resin
Epoxy resin
Fluorcarbon resin
Isocyanate or polyurethane
Nylon resin
Phenolics resin
Melamine-aldehyde resins
Polycarbonate resins
Polyester resin
Polyethylene resin
Polypropylene resin
Polystyrene resin
Silicone resin
Polyvinyl ester resin The molding compounds listed in Table I are exemplary of such compounds that may be used for the layers 16 and 18 of the base 10. The molding compounds may be used either singly or in combination with each other, and may include plasticizers, mold lubricants, dyes, pigments, and metal powder and fibers. Where the compounds are costly, the compounds are usually combined with one or more fillers. One desirable advantage of fillers is that they usually increase strength and reduce the brittleness of many resins by increasing the resistance to impact, in addition to providing other improved properties such as arc resistance. Many types of fillers for molding compounds are commercially available and only a few are listed in Table II.

TABLE II

Fillers for molding compounds

Organic fillers:
    Cellulose derivatives, e.g., cellulose acetate fibers
    Cellulosic fibers, e.g., cotton fibers and linters
    Comminuted cellulose, e.g., ground wood flour
    Lignin and lignin-extended fillers
    Proteinaceous fillers, e.g., ground feathers and wool fibers
    Nylon fiber filler
    Carbon fillers, e.g., carbon black and graphite
Inorganic fillers:
    Asbestos
    Mica
    Diatomaceous earth
    Chalk
    Glass fibers
    Barium sulfate
    Litharge
    Clay
    Hydrated alumina The amount of filler added to a molding compound varies from 10% to 70% of the mixture, the preferred amount being about 30% to 50%. The amount of filler used is largely dependent upon the particular molding compound used and its properties such as solidification or polymerization shrinkage. For example, the higher the solidification shrinkage of a molding compound a greater amount of filler will result in a proportionate decrease of shrinkage. Since many fillers are less expensive than the resin, this will call for use of as much filler as can be tolerated by the application.

Molding compounds, and particularly those containing fillers, are permeable to moisture in the cured state. For example, the water vapor permeability constant of 40% wood flour-filled phenolic resin is $$2.5 \times 10^{-9} \frac{(\text{inch}) (\text{gram})}{(\text{inch}^2) (\text{minute}) (\text{mm. Hg})}$$

In accordance with this invention, to improve the permeability constant of the wood flour-filled phenolic base, a film of material having a lower permeability constant for water vapor is preferably molded into the phenolic base transverse to the path of movement of the water vapor, thereby acting as a moisture barrier. The low vapor permeability film may be composed of such synthetic resins as fluorohalocarbon in particular polytrifluorochloroethylene, polyvinyl fluoride, polythylene terephthalate, and polytetrafluoroethylene. Some of the resin films are preferably surface treated, for instance, to roughen the surface, to improve the adhesion of the film to the layers of molding compound.

The film thickness may range from 0.0005 to 0.010 inch, the preferred thickness being about 0.002 inch. If the film is too thin, such as less than 0.005 inch, it becomes too difficult to handle in the mold and it may rupture during molding. The permeability constant of a film composed of flurorohalocarbon is $$3.0 \times 10^{-12} \frac{(gram)(inch)}{(inch^2)(minute)(mm.Hg)}$$

Samples of composite discs were preliminarily prepared and tested. The permeability constants of the samples with vapor barrier films are listed in Table III.

TABLE III.—PERMEABILITY CONSTANTS OF SAMPLES OF PHENOLIC RESIN WITH INDICATED BARRIER FILM

| Barrier film | Phenolic thickness film thickness | Constant [1] |
|---|---|---|
| Polytetrafluoroethylene | 11.5 | $5.3 \times 10^{-10}$ |
| Do | 25 | $9.11 \times 10^{-10}$ |
| Do | 50 | $1.325 \times 10^{-9}$ |
| Polytrifluorochloroethylene [2] | 50 | $1.44 \times 10^{-10}$ |
| Polytrifluorochloroethylene | 25 | $7.59 \times 10^{-11}$ |
| Polyethylene terephthalate | 25 | $1.878 \times 10^{-9}$ |
| Do | 10 | $1.41 \times 10^{-9}$ |

[1] $\frac{(gram)(inch)}{(Inch^2)(minute)(mm.Hg)}$

[2] Sold under Trademark ACLAR.

It will be observed that some of these films are one to two orders of magnitude lower in vapor permeability than the wood flour-phenolic molded resin. Another benefit obtained by the use of the films is that they are completely imperforate, and readily observed to be so on inspection. Moldings of filled plastics are not necessarily as homogeneous and may have porous portions or poorly consolidated molded interiors which defects are not readily evident on inspection. The films give assurance of a high degree of effectiveness of the composite molding to vapor permeability.

It is evident from Table III that a molded article with an embedded film of plastic resin of low permeability constant has improved moisture barrier characteristics.

Various pressures may be used for molding or forming the composite plastic resinous articles including injection molding, compression molding, and extrusion molding. Where the preforms 22 and 24 as shown in FIG. 2 are composed of thermosetting plastics such as phenolic resin or diallyl phthalate resin and a high proportion of filler, a pressure of approximately 1000 p.s.i. is applied to cause the resin to flow and fill the mold. On the other hand, if the molding compound is a fluid epoxy resin, a pressure of from 100 to 150 p.s.i. is sufficient.

The molding temperature for thermosetting resins may range up to from 300° to 350° F., a preferred temperature for many phenolics and allyls being about 325° F. The temperature must be maintained below the decomposition or melting temperature of the film 20 or 26. As a result of the applied pressure and temperature the film 20 or 26 gives by stretching or flowing with the molding compound layers on opposite sides thereof, which layers serve as a cushion between the film and any sharp mold surfaces to prevent the film from rupturing.

The molding time may vary from about 1 minute to 5 minutes, depending upon the resins and the applied temperature. For phenolics and epoxies at 350° F. the molding time may vary from 1 to 2 minutes, while at 300° F. the molding time may be as high as 5 minutes.

For thermoplastic resins, the temperatures should be below the temperature at which the film melts or softens excessively. The time of molding is quite short.

The following examples are illustrative of the present invention:

EXAMPLE I

Bases for watt-hour meters were molded with film inserts of polytrifluorochloroethylene resin between layers of phenolic resin filled with wood flour. The film insert was 0.002 inch thick and each phenolic layer was 0.172 inch thick. Thus the total composite thickness was 0.346 inch. The bases were molded by placing 5 inch diameter fluorohalocarbon film between two 5½ inch diameter preforms of the phenolic resin molding compound. The wood flour filler constituted 40% of the molding compound. The phenolic perform and polytrifluorochloroethylene composite was then preheated to 325° F. and molded by standard compression molding techniques by applying pressure of 1000 p.s.i. for 3 minutes. No molding difficulties were encountered and the resulting composite base showed excellent surfaces. The composite permeability constant of the base was $$2.02 \times 10^{-10} \frac{(gram)(inch)}{(inch^2)(minute)(mm.Hg)}$$

which was a tenfold improvement over the wood filled phenolic base without the film.

EXAMPLE II

In a similar maner as Example I, a fluorohalocarbon film of 0.002 inch thickness was molded between 0.172 inch thick layers of epoxy resin having a 40% clay filler. The permeability constant of the composite was $$1.5 \times 10^{-10} \frac{(gram)(inch)}{(inch^2)(minute)(mm.Hg)}$$

and had excellent surfaces.

EXAMPLE III

In a manner similar to Example I, a meter base was prepared with a fluorohalocarbon film insert between layers of diallyl phthalate resin filled with a 40% clay filler. The insert thickness was 0.002 inch and the resin layers were each 0.172 inch thick. The water vapor permeability constant was $$1.67 \times 10^{-20} \frac{(gram)(inch)}{(inch^2)(minute)(mm.Hg)}$$

EXAMPLE IV

In a manner similar to Example I a meter base was prepared with a 0.004 inch thick film insert of fluorohalocarbon resin molded between 0.170 inch thick layers of phenolic resin having a 40% wood flour filler. The permeability constant for the composite base was $$9.87 \times 10^{-11} \frac{(gram)(inch)}{(inch^2)(minute)(mm.Hg)}$$

Although inserts composed of fluorohalocarbon film have been disclosed in the foregoing examples because of its excellent water vapor barrier properties, other films or combinations of films may be used as barrers against water vapor as well as other gases. Polyvinyl fluoride has been used successfully as a moisture barrier in wood flour filled phenolic resin discs. Moreover, film inserts composed of polythylene terephthalate resin (Mylar) and polytetrafluoroethylene resin (Teflon) may be used as barriers for water vapor and other gases. The film barrier inserts are preferably preliminarily surface treated such as by chemical etching in a reactive solvent to improve the film's surface adhesion to the molding compound.

Matrix materials such as phenolic resin with fluorohalocarbon film inserts respond favorably to compression molding and provide very satisfactory surface adhesion between the matrix layers and the film. The tensile stress required to separate the fluorohalocarbon film from the wood flour filled phenolic resin matrix is between 200 and 300 p.s.i. Similar results are obtained with diallyl phthalate resin, although a higher tensile stress is required with epoxy resin molding compounds.

Compression molding is the preferred process because preforms of the matrix or molding compound provide a method for supporting the vapor barrier film prior to and during molding. Other molding processes, however, may be used such as injection or transfer molding if the film is suitably supported in the mold. A limitation to the molding process, whether it is compression molding or otherwise, is the molding temperature required. The melting and decomposition temperature of the film must be above the processing or flowing temperature of the matrix or molding compound.

Although the foregoing procedure is primarily directed to the improvement of a moisture barrier property for a watt-hour meter base with the expectation of ultimately providing a hermetically sealed meter, the technique may be used in protecting other devices from corrosive environments. For example, a barrier material can be selected to exclude corrosive media or other noxious materials. Polyethylene terephthalate resin may be used as an effective barrier film against methyl bromide; polyethylene resin is not useful for that purpose. On the other hand, polyethylene resin is more effective for excluding carbon dioxide than is polyethylene terephthalate resin.

Moreover, though the foregoing description is based upon a molded composite article prepared primarily by conventional plastic molding techniques such as compression, injection, and transfer molding, other known plastic fabricating procedures such as filament winding may be used as with glass fiber roving and adapted to include a barrier film having a very low permeability constant.

Accordingly, the present invention provides a molded plastic article having improved barrier characteristics for reducing the permeability of the article to the passage of undesirable gases and vapors. By providing a film insert having a lower permeability constant than that of the plastic matrix around the film, the relatively low cost of the plastic article can be maintained without substantial increase in cost. Finally, by using films of various composition, various types of gases or vapors can be prevented from passing through the molded plastic.

It is understood that the disclosure be construed as illustrative of the invention and not in limitation thereof.

What is claimed is:

1. A molded base for an electric meter comprising two layers of a resin selected from a group consisting of thermoplastic and thermosetting resins, a polytrifluorochloroethylene film having a thickness ranging from 0.0005 inch to 0.010 inch and disposed between a pair of the two layers, the film having a lower water vapor permeability constant than the water vapor permeability constant of the layers of resin, and the film being bonded directly to the resin without any intervening material.

2. The article of claim 1 in which the resin has a melting temperature below that of the film.

3. The article of claim 1 in which the film has a thickness of 0.002 inch.

4. The article of claim 1 in which the layers are composed of a phenolic resin having a filler of wood flour.

5. The article of claim 1 in which the layers are composed of diallyl phthalate resin.

6. The molded base of claim 1 in which the layers are composed of epoxy resin.

References Cited

UNITED STATES PATENTS

| | | | |
|---|---|---|---|
| 2,788,306 | 4/1957 | Cox et al. | 156—309X |
| 2,828,236 | 3/1958 | West | 161—68 |
| 2,623,025 | 12/1952 | Dearing et al. | 260—17.4 |

PHILIP DIER, Primary Examiner

U.S. Cl. X.R.

161—189, 257; 264—260, 275; 156—245